Patented May 27, 1930

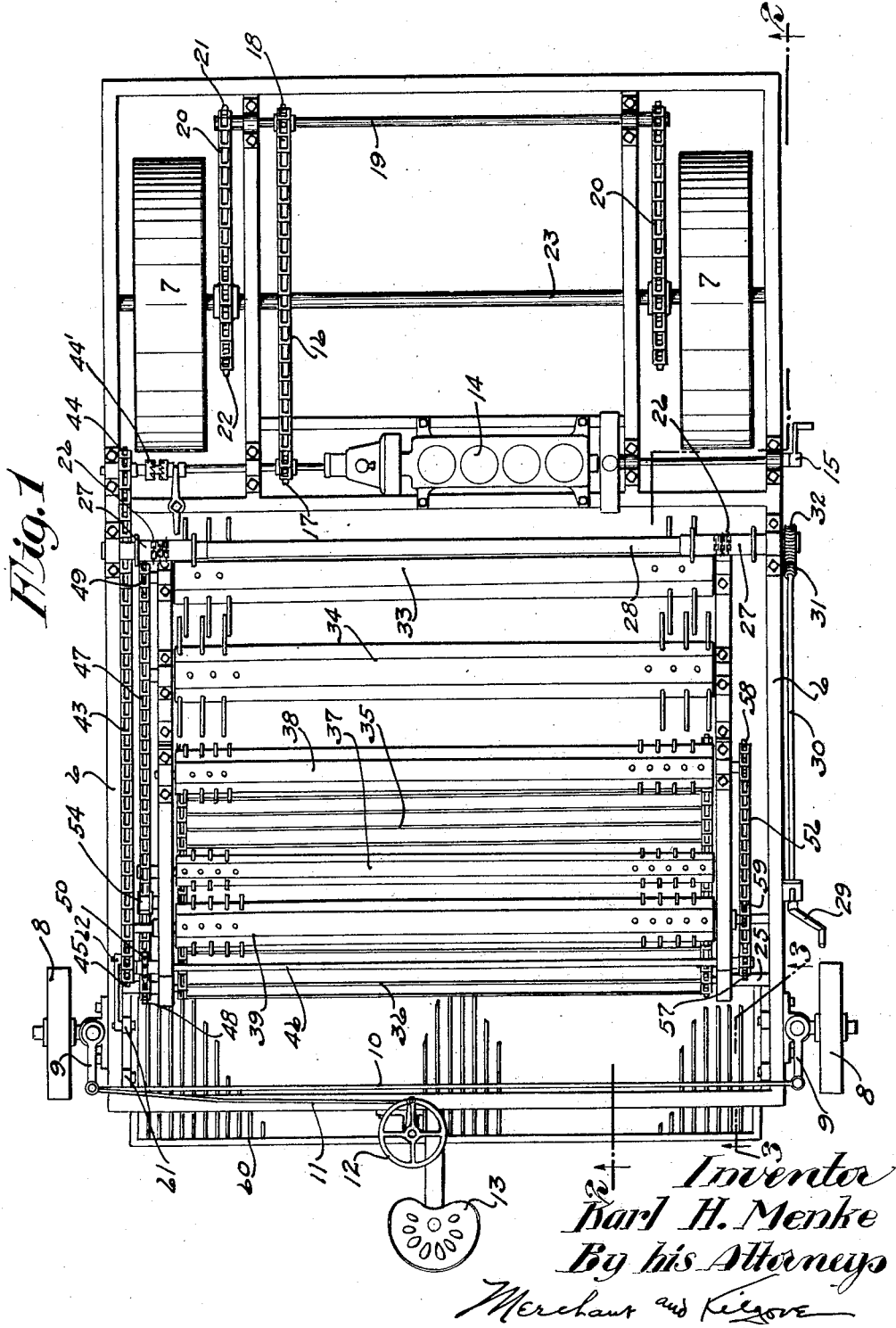

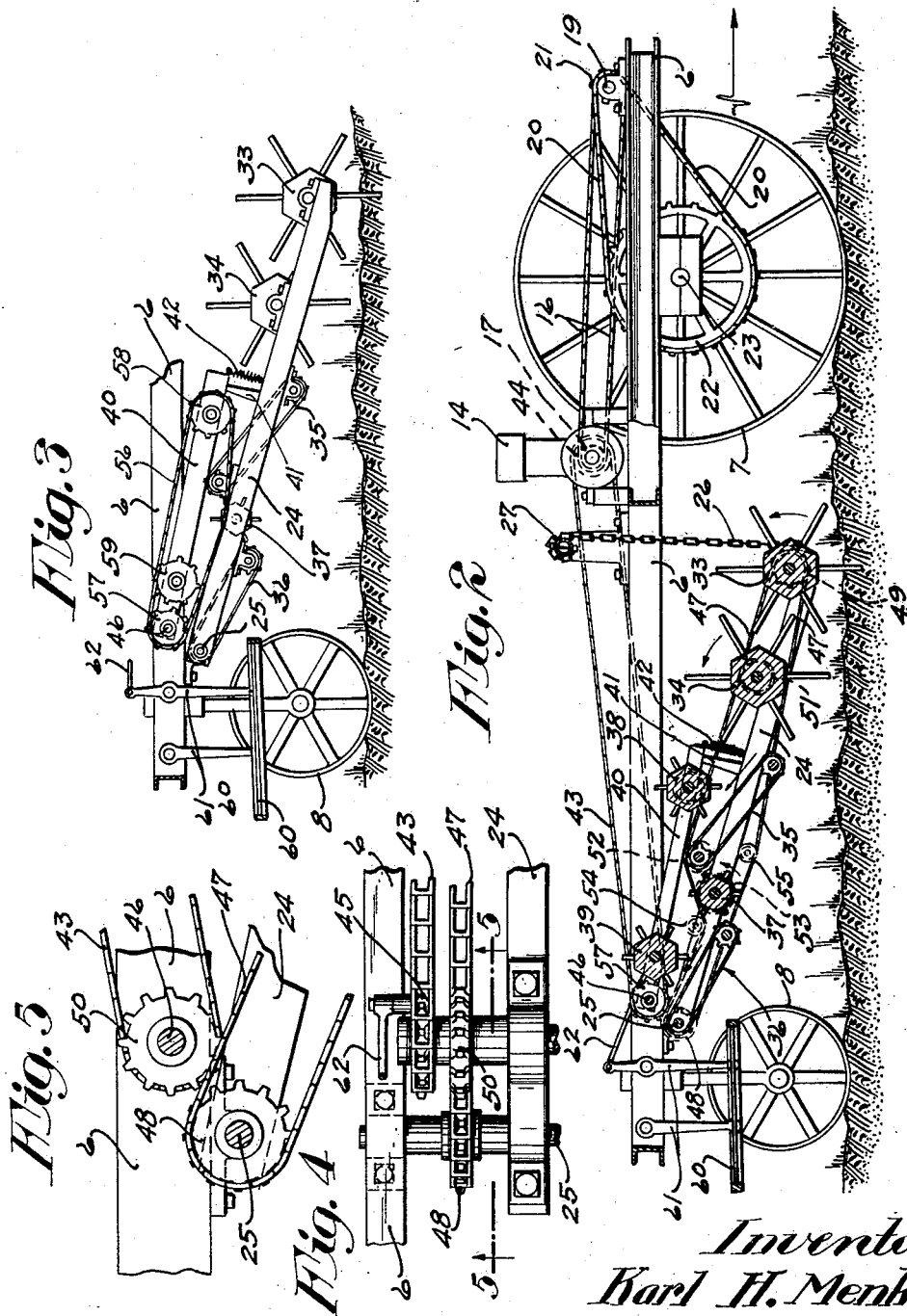

1,760,203

UNITED STATES PATENT OFFICE

KARL H. MENKE, OF OWATONNA, MINNESOTA

QUACK-GRASS DIGGER

Application filed March 12, 1928. Serial No. 261,021.

My invention has for its object the provision of a highly efficient machine for digging quack grass, and to this end it consists of the novel devices and combinations of devices hereinafter described and defined in the claims.

In the accompanying drawings, which illustrate the invention, like characters indicate like parts throughout the several views.

Referring to the drawings:

Fig. 1 is a plan view of the improved quack grass digger with some parts removed;

Fig. 2 is a view partly in side elevation and partly in section taken on the line 2—2 of Fig. 1;

Fig. 3 is a side elevation of the supplemental frame and parts carried thereby and also showing a fragment of the truck with some parts sectioned on the line 3—3 of Fig. 1;

Fig. 4 is a fragmentary detail view in plan showing certain of the driving connections; and Fig. 5 is a detail view with some parts sectioned on the line 5—5 of Fig. 4.

The numeral 6 indicates the main frame of a self-propelled truck mounted on a pair of relatively large front traction wheels 7 and a pair of relatively small rear steering wheels 8 journaled on said frame for angular steering movement. Said steering wheels 8 are connected for common movement by crank arms 9 and a crosstie rod 10. Steering movements are imparted to the wheels 8 by steering mechanism 11 which includes a hand wheel 12 closely positioned to a seat 13 on the main frame 6.

Mounted on the main frame 6 is an internal combustion engine 14 for propelling the truck and its operating crank 15 projects outward of the right-hand side of said frame. The following connections are provided for operating the traction wheels 7 from the engine 14, to wit:

A sprocket chain 16 runs over a sprocket wheel 17 on the shaft of said engine and a sprocket wheel 18 on a countershaft 19 journaled in bearings on the main frame 6 forward of the traction wheels 7, and a pair of sprocket chains 20 which run over relatively small sprocket wheels 21 on the countershaft 19 and relatively large sprocket wheels 22 on the shaft 23 for said traction wheels.

A rearwardly inclined supplemental frame has its rear end pivoted on a shaft 25 journaled in bearings on the main frame 6 and supports said frame for vertical swinging movement.

The front end of the supplemental frame 24 is raised and lowered and held where positioned by a pair of chains 26, the lower ends of which are attached to the front end of said supplemental frame and their upper ends are attached to windlass drums 27 mounted on a windlass shaft 28 journaled in bearings on the main frame 6. The windlass shaft 28 is operated by a hand crank 29 on a shaft 30 mounted in bearings on the main frame 6 and having a worm 31 that meshes with a worm gear 32 on said windlass shaft. Obviously, by operating the hand crank 29, the windlass shaft 28 may be operated to wind the chains 26 on the windlass drum 27 or unwind the same therefrom and the intermeshing worm 31 and worm gear 32 will hold said shaft where set.

Front and rear tooth-equipped cylinders 33 and 34 are journaled on the supplemental frame 24 at the front end portion thereof. Also mounted on the supplemental frame 24 rearward of the cylinders 33 and 34 are front and rear elevators 35 and 36, respectively. These elevators 35—36 are rearwardly inclined and it will be noted that the receiving end of the front elevator 35 is considerably below the axis of the rear cylinder 34 to which it is closely positioned and that the receiving end of the rear elevator 36 is considerably below the delivery end of the front elevator 35. Said elevators 35—36 are of the slat and belt type and their belts are in the form of sprocket chains which run over sprocket wheels on front and rear shafts journaled in the supplemental frame 24.

A hurdle 37 in the form of a toothed cylinder is journaled on the supplemental frame 24 between the delivery end of the front elevator 35 and the receiving end of the rear elevator 36. Mounted over the front and rear elevators 35—36 are beaters 38 and 39, respectively, and each thereof is in the form of a toothed cylinder. The shaft of the rear beater 39 is journaled on the main frame 6 and the shaft of the front beater 38 is journaled in a pair of forwardly projecting bars 40 pivoted to the countershaft 46 for vertical swinging movement.

The front or free ends of the bars or arms 40 normally rest on a fixed post 41 on the supplemental frame 24 and a pair of tension springs 42 attached to said bars and anchored to the supplemental frame 24 yieldingly hold said arms on the post 41 with freedom for lifting movement. The posts 41 normally support the arms 40 with the beaters 38 and 39 the proper distance above the elevators 35 and 36 but permit said beaters to raise and lower as required during the passing of the dirt between the elevators and beaters and also prevent damage to the machine in case hard pieces of dirt, stones, sticks or the like pass between the elevators and beaters.

The front toothed cylinder 33 is driven from the engine 14 by the following connections, to wit: A long sprocket chain 43 runs over a sprocket wheel 44 on the shaft of said engine and a sprocket wheel 45 on the countershaft 46 journaled on the main frame 6 and a long sprocket chain 47 which runs over a sprocket wheel 48 on the rear shaft of the rear elevator 36 a sprocket wheel 49 on the shaft of the front cylinder 33 and under a sprocket wheel 50 on said countershaft from which said chain 47 is driven. The cylinder 34, front elevator 35 and hurdle 37 are also driven by the chain 47 which runs over a sprocket wheel 51 on the shaft of said rear cylinder 34, a sprocket wheel 52 on the rear shaft of the front elevator 35, and a sprocket wheel 53 on the shaft of said hurdle. The upper run of the sprocket wheel 47 between the sprocket wheels 48 and 53 runs under a guide wheel 54 and the lower run of said sprocket chain runs under a guide wheel 55.

The two beaters 38 and 39 are driven from the countershaft 46 by a sprocket chain 56 which runs over a sprocket wheel 57 on said countershaft and sprocket wheels 58 and 59 on the shafts of said beaters 38 and 39, respectively.

The sprocket wheel 44 is connected to the shaft of the engine 14 by a clutch 44' so that the truck may be propelled without operating the other mechanism of the quack grass digger. Suitable connections for operating the clutch 44' may be provided so that the same may be operated by the operator on the seat 13. Mounted on the main frame 6 rearward of the rear elevator 36 is a shaking grate 60 suspended by pairs of front and rear arms 61. Shaking movement is imparted to the grate 60 by a pitman 62. This pitman 62 is connected to the sprocket wheel 45 by a crank and to an extension on the front left-hand arm 61.

The operation of the above described quack grass digger may be briefly described as follows:

The supplemental frame 24 is lowered by means of the chains 26 so as to cause the teeth of the front cylinder 33 to enter the ground to any desired depth and dig the quack grass therefrom. As the quack grass is dug up by the teeth of the front cylinder 43, the same is carried upward over said cylinder and delivered onto the rear toothed cylinder 34 where a large amount of the loose dirt in the quack grass is removed and falls back onto the ground. From the cylinder 34 the quack grass is delivered onto the front elevator 35 and is carried thereby under the beater 38 which breaks up any chunks of dirt to release the same from the roots of the quack grass and this dirt drops through said elevator onto the ground. From the front elevator 35 the quack grass is delivered onto the rear elevator 36 by the toothed hurdle 43 where the quack grass is thrown to release the loose dirt therein.

As the quack grass is carried upward by the elevator 36, the same is subjected to the action of the rear beater 39 which loosens any further dirt that may adhere to the roots of the quack grass, so that the same is precipitated through said elevator onto the ground. From the elevator 36 the quack grass is delivered onto the shaking grate 60 and the loose dirt separated therefrom. From the grate 60, the quack grass is discharged onto the ground from the rear end thereof.

If desired, the machine may be equipped with a cross conveyor to carry the quack grass to one side thereof and deposit the same either in windrows or in the box of a wagon or truck following at the side of the quack grass digger. The quack grass when deposited on the ground at the rear of the machine or in windrows at the side thereof may be either burned or picked up or it may be left in the ground in case the same is dug in the fall and subjected to frost to kill the same and then plowed under in the spring when seeding, for instance, corn.

What I claim is:

1. In a machine of the class described, the combination with a truck, of a rearwardly inclined supplemental frame mounted on the truck, front and rear toothed cylinders journaled on the supplemental frame, front and rear elevators of the slat and belt type mounted on the supplemental frame, a hurdle working between said two elevators, and a beater working over each elevator.

2. In a machine of the class described, the combination with a truck, of a rearwardly inclined supplemental frame hinged at its rear end to the truck for vertical swinging movement, a lifting device suspending the front end of the supplemental frame from the truck, front and rear toothed cylinders journaled on the supplemental frame, front and rear elevators of the slat and belt type mounted on the supplemental frame, a hurdle working between said two elevators, a pair of forwardly projecting arms pivoted to the truck, a front beater journaled on the arms over the front elevator, means for adjustably supporting the arms from the supplemental frame, a rear beater journaled on the truck over the rear elevator, and driving means for the cylinders, elevators and beaters.

3. The structure defined in claim 2 in further combination with a shaking grate mounted on the truck rearward of the rear elevator and operated by said driving means.

4. In a machine of the class described, the combination of the truck, of front and rear toothed cylinders journaled on a part carried by the truck, front and rear elevators mounted on a part carried by the truck rearward of the cylinders, a hurdle working between said two elevators, and a beater working over each elevator.

5. In a machine of the class described, the combination of the truck, of a toothed cylinder journaled on a part carried by the truck, an elevator mounted on a part carried by the truck rearward of the cylinder, a hurdle working at the rear of the elevator, and a beater working over the elevator.

In testimony whereof I affix my signature.

KARL H. MENKE.